US012717145B2

(12) United States Patent
Yamaguchi

(10) Patent No.: US 12,717,145 B2
(45) Date of Patent: Aug. 25, 2026

(54) VIRTUAL IMAGE DISPLAY DEVICE AND OPTICAL UNIT

(71) Applicant: SEIKO EPSON CORPORATION, Tokyo (JP)

(72) Inventor: Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/077,047

(22) Filed: Mar. 11, 2025

(65) Prior Publication Data

US 2025/0291190 A1 Sep. 18, 2025

(30) Foreign Application Priority Data

Mar. 13, 2024 (JP) ................................ 2024-038756

(51) Int. Cl.
*G02B 27/01* (2006.01)
*G02B 5/30* (2006.01)
*G02F 1/13357* (2006.01)

(52) U.S. Cl.
CPC ....... *G02B 27/0172* (2013.01); *G02B 5/3016* (2013.01); *G02B 5/3066* (2013.01); *G02B 27/0176* (2013.01); *G02B 2027/013* (2013.01); *G02B 2027/0152* (2013.01); *G02B 2027/0178* (2013.01); *G02F 1/13362* (2013.01)

(58) Field of Classification Search
CPC .............. G02B 27/0172; G02B 5/3016; G02B 5/3066; G02B 27/0176; G02B 2027/013; G02B 2027/0152; G02B 2027/0178; G02F 1/13362
See application file for complete search history.

(56) References Cited

U.S. PATENT DOCUMENTS 10,712,485 B1 * 7/2020 Lam ......................... B05D 3/06
12,468,154 B2 * 11/2025 Dehkordi ............. G02B 27/017
12,468,157 B2 * 11/2025 Xiao .................. G02B 27/0172
2014/0347613 A1 * 11/2014 Kim .................. G02F 1/133634
313/112

(Continued)

FOREIGN PATENT DOCUMENTS

CN 216622857 U * 5/2022
EP 3940435 A1 * 1/2022 ............ C01G 41/00

(Continued)

*Primary Examiner* — Douglas Wilson
(74) *Attorney, Agent, or Firm* — JCIPRNET

(57) ABSTRACT

A virtual image display device includes a display, and an optical member, in which the optical member includes a lens member, a transmissive reflective optical element provided facing a first optical surface of the lens member that is close to the display, a reflective polarizing optical element provided facing a second optical surface of the lens member that is far from the display and reflects first polarized light, that is, image light linearly polarized light in a first polarization direction, and a wave plate provided between the reflective optical element and the polarizing optical element, is formed of a photo-crosslinkable polymeric liquid crystal material, converts the image light, that is, linearly polarized light in the first polarization direction, and converts the image light, that is reflected by the reflective optical element to reciprocate, into second polarized light in a second polarization direction.

10 Claims, 10 Drawing Sheets

(56) References Cited

U.S. PATENT DOCUMENTS

| | | | | |
|---|---|---|---|---|
| 2018/0120579 | A1 | 5/2018 | Gollier et al. | |
| 2020/0041795 | A1 | 2/2020 | Yamaguchi et al. | |
| 2021/0132349 | A1 | 5/2021 | Khan et al. | |
| 2022/0252885 | A1* | 8/2022 | Wang ................. | G02B 27/0101 |
| 2024/0310633 | A1* | 9/2024 | Hudman ............ | G02B 27/0093 |

FOREIGN PATENT DOCUMENTS

| | | |
|---|---|---|
| JP | 2019526075 | 9/2019 |
| JP | 2020024246 | 2/2020 |

* cited by examiner

VIRTUAL IMAGE DISPLAY DEVICE AND OPTICAL UNIT

The present application is based on, and claims priority from JP Application Serial Number 2024-038756, filed Mar. 13, 2024, the disclosure of which is hereby incorporated by reference herein in its entirety.

BACKGROUND

1. Technical Field

The present disclosure relates to a virtual image display device and an optical unit that enable observation of a virtual image, and particularly, to a non-see-through type virtual image display device and the like.

2. Related Art

A known virtual image display device includes an image element that displays an image, a first optical unit disposed at a position where image light is extracted, a second optical unit disposed closer to the image element than the first optical unit, a Fresnel-type half mirror formed at a bonding portion between the first optical unit and the second optical unit, and a transmission/reflection selection member provided on a light emission side of the first optical unit and selectively transmitting and reflecting light in accordance with the polarization state of light (JP-A-2020-24246).

In the device disclosed in JP-A-2020-24246, since the Fresnel-type half mirror is incorporated between the first optical unit and the second optical unit, the surface shape of the optical unit becomes complicated, and there is a possibility that image formation will be deteriorated when light is reflected by or passes through the half mirror.

Although the device disclosed in JP-A-2020-24246 uses a flat plate having a Fresnel-type lens embedded therein as an imaging system, it is also conceivable to use a meniscus lens instead of the flat plate. However, when the meniscus lens is used instead of the flat plate, a ¼ wave plate configuring a transmission/reflection selection member is formed at a curved surface, birefringence characteristics of the ¼ wave plate change due to the curvature, and there is a possibility that a desired phase difference effect will not be obtained. In addition, when the ¼ wave plate is attached, there is a possibility that birefringence characteristics will be affected.

SUMMARY

A virtual image display device according to one aspect of the present disclosure includes a display that emits circularly polarized image light, and an optical member that folds back the image light twice by reflection to form a virtual image, in which the optical member includes a lens member, a transmissive reflective optical element that is provided facing a first optical surface of the lens member that is close to the display, a reflective polarizing optical element that is provided facing a second optical surface of the lens member that is far from the display and reflects image light, that is linearly polarized light in a first polarization direction, and a wave plate that is provided between the reflective optical element and the polarizing optical element, is formed of a liquid crystal material, converts the image light having passed through the reflective optical element into linearly polarized light in a first polarization direction, and converts the image light, that is reflected by the reflective optical element to reciprocate, into linearly polarized light in a second polarization direction.

DESCRIPTION OF EMBODIMENTS

First Embodiment

A virtual image display device of a first embodiment of the present disclosure will be described below with reference to FIGS. 1 to 3.

Figure 1:
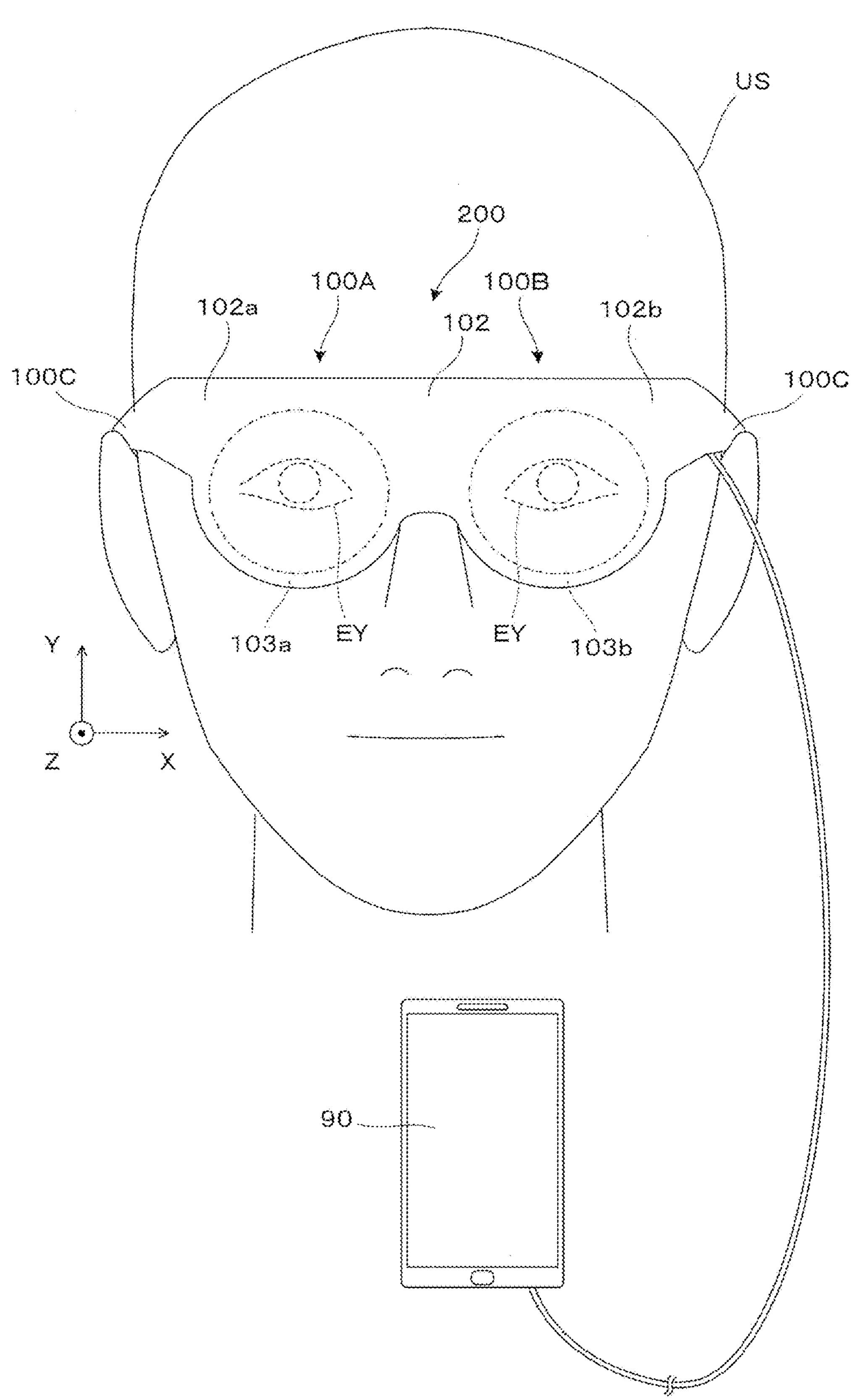
FIG. 1 is an external perspective view showing a mounted state of a virtual image display device according to a first embodiment.

FIG. 1 is a perspective view showing a mounted state of a head-mounted display, that is, a head-mounted display device 200. The head-mounted display device (hereinafter, also referred to as an HMD) 200 allows an observer or a wearer US who wears the HMD 200 to recognize a video as a virtual image. In FIG. 1 and the like, X, Y, and Z represent a rectangular coordinate system. The +X direction corresponds to a lateral direction in which both eyes EY of the observer or the wearer US, who wears the HMD 200, are arranged. The +Y direction corresponds to the upper direction perpendicular to the lateral direction from the viewpoint of the wearer US in which both of the eyes EY are arranged. The +Z direction corresponds to the forward direction or the front side direction from the viewpoint of the wearer US. The +Y direction is parallel to the perpendicular axis or the perpendicular direction.

The HMD 200 includes a first virtual image display device 100A for a right eye, a second virtual image display device 100B for a left eye, a pair of temples 100C that support the virtual image display devices 100A and 100B, and a user terminal 90 being an information terminal. The first virtual image display device 100A is configured with a first display drive unit 102*a* disposed in an upper portion and a first display optical system 103*a* that covers the area in front of the eyes. The second virtual image display device 100B is configured with a second display drive unit 102*b* disposed in an upper portion and a second display optical system 103*b* that covers the area in front of the eyes. The HMD 200 obtained by combining the first virtual image display device 100A and the second virtual image display device 100B together is also a virtual image display device in a broader sense. The pair of temples 100C support the upper ends of the pair of display optical systems 103*a* and 103*b* via the display drive units 102*a* and 102*b* that are integrated in appearance. A combination of the pair of display drive units 102*a* and 102*b* is referred to as a driving device 102.

Figure 2:
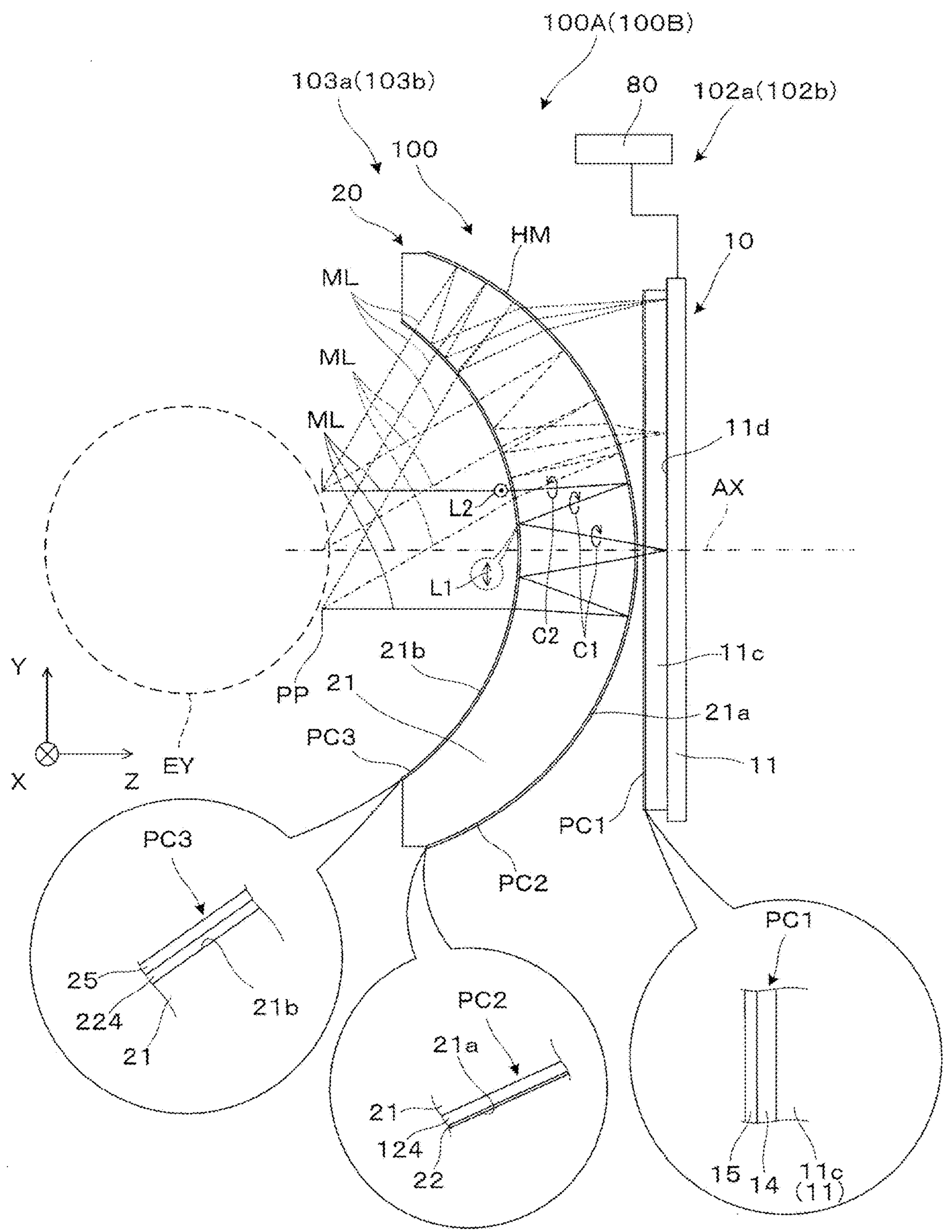
FIG. 2 is a side view showing an optical structure of a display optical system.

FIG. 2 is a conceptual side view showing the structure of the first display optical system 103*a*. The first display optical system 103*a* includes a display 10 that emits circularly polarized image light ML, an optical member 20 that folds back the image light ML twice by reflection to form a virtual image, and a circuit member 80 that controls operations of the display 10 and the like.

In the first virtual image display device 100A, the optical device excluding the circuit member 80 (specifically, the display 10 and the optical member 20) will be referred to as an optical unit 100.

Although detailed description will be omitted, the second display optical system 103*b* is optically identical to the first display optical system 103*a*, or is a left-right inverted version of the first display optical system 103*a*. In the following, the first display optical system 103*a* will be described, and description of the second display optical system 103*b* will be omitted.

In the case of the display optical systems 103*a* and 103*b* shown in the drawing, FOV120° is achieved, and a distance from the display 10 to an emission surface at the rear end of the outer edge of the optical member 20 is 13 mm.

In the first display optical system 103*a*, the display 10 includes an image display panel 11 that is a self-luminous image light generation device, and a polarizing control member PC1 that converts the image light ML emitted from the image display panel 11 into circularly polarized light.

The image display panel 11 is, for example, an organic electroluminescence (EL) display, and forms a monochrome or color still image or moving image on a two-dimensional display surface 11*d*. The image light ML emitted from the image display panel 11 includes randomly polarized light. The image display panel 11 is driven by the circuit member 80 to perform a display operation. The image display panel 11 is not limited to the organic EL display, and can be replaced with a display device using inorganic EL, an organic LED, an LED array, a laser array, a quantum dot light emission element, or the like.

The image display panel 11 is not limited to a self-luminous image light generation device, and may be configured with an LCD or any of other light modulation elements and form an image by illuminating the light modulation element with a light source such as a backlight.

The polarizing control member PC1 includes a linear polarizing plate 14 and a ¼ wave plate 15 in this order from the image display panel 11 side.

The linear polarizing plate 14 is, for example, an absorption-type polarizing plate, and selectively transmits only second linearly polarized light (horizontally polarized light) in the X direction which is the horizontal direction in the present embodiment. That is, only linearly polarized light in the X direction of the image light ML emitted from the image display panel 11 passes through the linear polarizing plate 14 and is incident on the ¼ wave plate 15. The linear polarizing plate 14 has a sheet shape, and is manufactured by stretching a film in which a dichroic dye such as iodine is impregnated into polyvinyl alcohol (PVA) in a certain direction.

The ¼ wave plate 15 has its main axis or fast axis set between the vertical and horizontal directions, that is, between the Y direction and the X direction, and converts the second linearly polarized light (horizontally polarized light) that has passed through the linear polarizing plate 14 into, for example, right-handed circularly polarized light C1. The ¼ wave plate 15 is formed of, for example, a liquid crystal material such as a photo-crosslinkable polymer liquid crystal material, but may be formed by processing a birefringent crystal material such as quartz into a thin plate. As a specific manufacturing method, the linear polarizing plate 14 is provided on a cover glass 11*c* of the image display panel 11, and the ¼ wave plate 15 made of a UV-curable photo-crosslinkable polymer liquid crystal material is provided thereon. The photo-crosslinkable polymer liquid crystal material is applied onto the cover glass 11*c* by spin coating, ink jet, or the like while controlling the film thickness thereof, and then irradiated with polarized ultraviolet light and baked to function as the ¼ wave plate 15.

The optical member 20 includes a polarizing control member PC2, a lens member 21, and a polarizing control member PC3 in order from the image display panel 11 side.

The number of lenses configuring the optical member 20 for image formation is one, which is an extremely optically simple configuration. In addition, since it can be configured with one lens, the number of components is simply reduced, and further, a process of bonding lenses together is not required, and thus it is possible to greatly reduce the cost as compared with a configuration of the related art. As a result, the weight of the entire optical system can be extremely reduced.

In the optical member 20, the polarizing control member PC2 includes a reflective optical element 22 and a first wave plate 124 in order from the image display panel 11 side. The polarizing control member PC3 includes a second wave plate 224 and a reflective polarizing optical element 25 in order from the lens member 21 side.

In the polarizing control member PC2, the reflective optical element 22 is a transmissive mirror HM, and partially transmits and partially reflects the image light ML. The reflective optical element 22 covers a pupil position PP at which the eye EY or the pupil is disposed, has a concave shape toward the pupil position PP, and has a convex shape toward the outside. The reflectance of the reflective optical element 22 with respect to the image light ML is set to, for example, approximately 50% from the viewpoint of securing the luminance of the image light ML, but is not limited thereto. The reflective optical element 22 is a single layer film or a multilayer film of a metal such as Al or Ag with an adjusted film thickness. The reflective optical element 22 can be formed by stacking using vapor deposition, for example, but can also be formed by attaching a sheet-like reflective film.

The first wave plate 124 has its main axis or fast axis set between the vertical and horizontal directions, that is, between the Y direction and the X direction, and converts circularly polarized light having passed through the lens member 21, for example, right-handed circularly polarized light C1, into elliptically polarized light. The first wave plate 124 is formed of a liquid crystal material such as a photo-crosslinkable polymer liquid crystal material. The first wave plate 124 is a film-like wave plate having flexibility, and is specifically formed of an ultraviolet-curable photo-crosslinkable polymer liquid crystal material.

The lens member 21 is a concavo-convex lens having a positive power, and has a first optical surface 21*a* on the incidence side and a second optical surface 21*b* on the emission side. The first optical surface 21*a* and the second optical surface 21*b* are curved surfaces, and specifically, spherical surfaces or aspherical surfaces. The lens member 21 may be formed of, for example, a resin, but may also be formed of glass. The lens member 21 formed of glass is advantageous from the viewpoint of miniaturization. The reflective optical element 22 is provided facing the first optical surface 21*a*, and more specifically, is indirectly formed at the first optical surface 21*a* via a thin film-like first wave plate 124. That is, although the first optical surface 21*a* and the reflective optical element 22 have the same shape, the first optical surface 21*a* functions as a convex refractive surface, and the reflective optical element 22 functions as a concave reflective surface. On the other hand, the polarizing optical element 25 is provided facing the second optical surface 21*b*, and more specifically, is formed at the second optical surface 21*b* via a thin film-like second wave plate 224. That is, although the second optical surface 21*b* and the polarizing optical element 25 have the same shape, the second optical surface 21*b* functions as a concave refractive surface, and the polarizing optical element 25 functions as a convex reflective surface.

In the polarizing control member PC3, the second wave plate 224 has its main axis or fast axis set between the vertical and horizontal directions, that is, between the Y direction and the X direction, and the retardation of a combination of the first wave plate 124 and the second wave plate 224 corresponds to that of a ¼ wave plate. That is, the second wave plate 224 converts the elliptically polarized light having passed through the lens member 21 into first vertically polarized light L1 in a first polarization direction corresponding to the vertical direction or the Y direction which is the perpendicular direction. The second wave plate 224 is formed of a liquid crystal material such as a photo-crosslinkable polymer liquid crystal material. The second wave plate 224 is a film-like wave plate having flexibility, and is specifically formed of an ultraviolet-curable photo-crosslinkable polymer liquid crystal material.

Manufacture of the first wave plate 124 and the second wave plate 224 will be briefly described. For example, a photo-crosslinkable polymer liquid crystal material is applied onto a flexible transparent resin substrate to form a photo-crosslinkable polymer liquid crystal material layer, that is, a thin film. By irradiating the thin film of the photo-crosslinkable polymer liquid crystal material with linearly polarized ultraviolet light having a controlled polarization direction, it is possible to control the alignment state of rod-like molecular species (that is, molecules having a refractive index difference between the major axis and the minor axis) exhibiting liquid crystalline properties while curing the thin film of the photo-crosslinkable polymer liquid crystal material. At this time, molecular species extending in a direction coinciding with the polarization direction of the ultraviolet light among molecular species exhibiting liquid crystalline properties by ultraviolet light are crosslinked, and the alignment state is fixed in the same direction as the polarization direction. After the irradiation with ultraviolet light, the thin film of the photo-crosslinkable polymer liquid crystal material is annealed. Thereby, the molecular species exhibiting liquid crystalline properties of which the alignment state has not been changed by ultraviolet light are changed into liquid crystals, and the alignment state can be made to coincide with a polymer portion which has already been in a target alignment state, and the alignment state is fixed by subsequent cooling. That is, it is possible to obtain a wave plate configured with a thin film in which the orientation directions of most of molecular species exhibiting liquid crystalline properties and configuring a photo-crosslinkable polymer liquid crystal material are made to coincide with each other. In such a wave plate, the retardation can be adjusted by adjusting its thickness. The first wave plate 124 and the second wave plate 224 obtained in this manner are fixed to the lens member 21 by being respectively attached to the first optical surface 21*a* and the second optical surface 21*b* using, for example, an adhesive. In the above description, the wave plates 124 and 224 are formed by applying the photo-crosslinkable polymer liquid crystal material onto the transparent resin base material, but the wave plates 124 and 224 may be directly formed by applying it onto the optical surfaces 21*a* and 21*b* of the lens member 21.

A liquid crystal optical body such as the first wave plate 124 and the second wave plate 224 can also be manufactured by a method of manufacturing a liquid crystal optical body described in Japanese Patent Application Laid-Open No. 501147/2008. A liquid crystal optical body such as the first wave plate 124 and the second wave plate 224 can also be manufactured by a method described in https://www.jstage.jst.go.jp/article/oubutsu1932/70/9/70_9_1078/_pdf.

Figure 3:
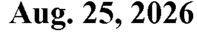
FIG. 3 is a diagram showing the manufacture of a first wave plate and a second wave plate.
Figure 3:
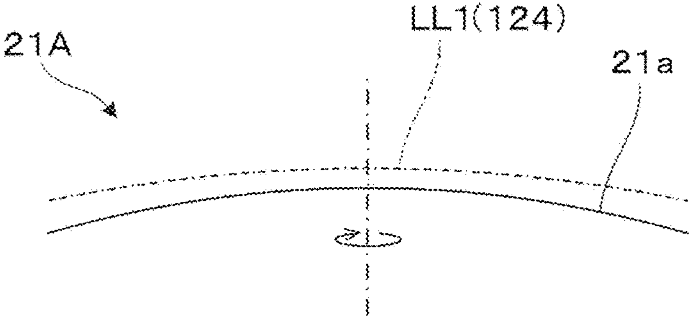
Figure 3:
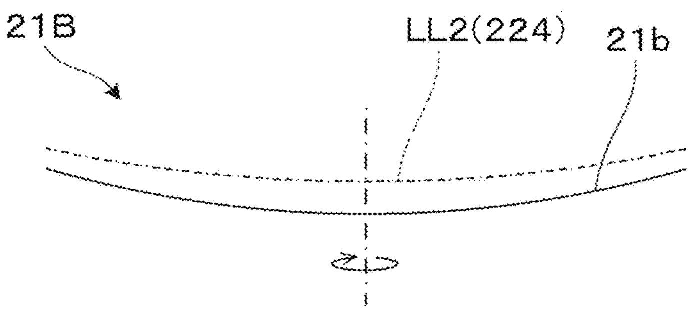

With reference to FIG. 3, description will be given of a contrivance for manufacturing the first wave plate 124 and the second wave plate 224. The retardation of the wave plates 124 and 224 varies depending on the thickness of the liquid crystal layer. When the photo-crosslinkable polymer liquid crystal material is applied onto the optical surfaces 21*a* and 21*b*, a technique such as a spin coater is conceivable. However, since the liquid crystal material at the time of application contains a solvent and is low in viscosity, there is a concern that the film thickness of the liquid crystal material may become uneven in the optical surfaces 21*a* and 21*b*. However, with respect to the first wave plate 124, a liquid crystal material LL1 is spin-coated on the lens member 21A in a state where the convex first optical surface 21*a* faces upward, and with respect to the second wave plate 224, a liquid crystal material LL2 is spin-coated on the lens member 21B in a state where the concave second optical surface 21*b* faces upward. Thus, the first wave plate 124 on the convex first optical surface 21*a* tends to become thin on the inner side and become thick on the outer side, and the second wave plate 224 on the concave second optical surface 21*b* tends to become thick on the inner side and become thin on the outer side. As a result, a film thickness distribution of the first wave plate 124 and a film thickness distribution of the second wave plate 224 cancel out each other, and the wave plates 124 and 224 as a whole can function as a uniform and accurate ¼ wave plate in the plane with respect to a direction perpendicular to an optical axis AX. When the viscosity of the liquid crystal material applied to the first optical surface 21*a* and the viscosity of the liquid crystal material applied to the second optical surface 21*b* are individually and appropriately adjusted even when the curvatures of the first optical surface 21*a* and the second optical surface 21*b* are largely different from each other, it is possible to cancel out the film thickness distribution between the wave plates 124 and 224. Further, in the case of spin coating, it is possible to control a film thickness distribution in the lens surface by adjusting the rotation speed while considering the viscosity of the liquid crystal material, and it is easy to cancel out the film thickness distribution between the wave plates 124 and 224.

Referring back to FIG. 2, the polarizing optical element 25 is a wire grid polarizer, and selectively reflects first linearly polarized light L1 in a first polarization direction corresponding to the Y direction that is the vertical direction or the perpendicular direction, and selectively transmits only second vertically polarized light L2 in a second polarization direction corresponding to the X direction which is the horizontal direction. The polarizing optical element 25 has a structure in which a large number of thin metal wires made of aluminum, nickel, or the like are arranged in parallel on a flexible transparent resin base material, for example, and a wire grid layer configured with the large number of thin metal wires is covered with a transparent protective layer. The polarizing optical element 25 reflects linearly polarized light having an electric field component (corresponding to the polarization direction) parallel to the direction in which the large number of thin metal wires extend and perpendicular to the periodic direction corresponding to the arrangement direction. The main body of the polarizing optical element 25 is manufactured by transferring the concavo-convex shape to the surface of a resin film formed of a UV resin or a thermoplastic resin using a mold having a concavo-convex structure, and then vapor-depositing aluminum on the top and side surfaces of convex portions of the concavo-convex shape from an oblique direction using a vacuum vapor deposition method. The main body of the polarizing optical element 25 can also be manufactured by applying a polymer solution onto the mold having a concavo-convex structure using a spin coating method and curing the polymer solution formed at the surface of the mold (see, for example, JP-A-2011-221334). The polarizing optical element 25 obtained in this manner is fixed to the lens member 21 by being attached to the second wave plate 224 using, for example, an adhesive.

The polarizing optical element 25 may not be a wire grid polarizer but may be, for example, a polarizer of a type in which a plurality of films provided with anisotropy by rolling are stacked.

Figure 4:
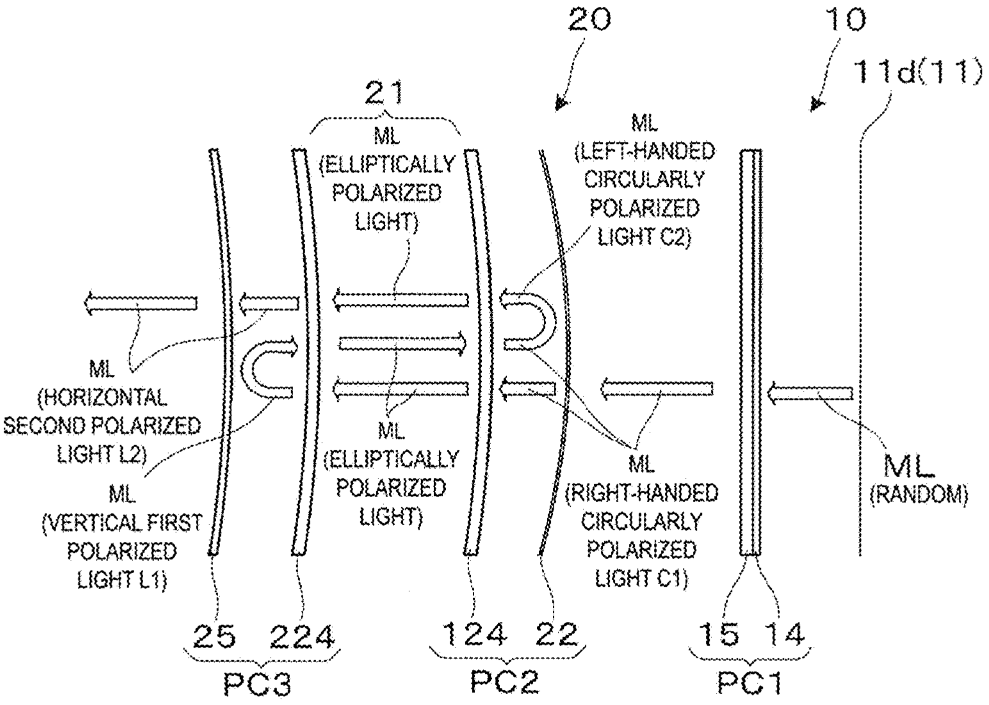
FIG. 4 is a conceptual diagram showing optical operations of the virtual image display device according to the first embodiment.

Referring to FIG. 4, the image light ML emitted from the display 10 passes through the polarizing control member PC1 and is converted into the right-handed circularly polarized light C1. The image light ML of the right-handed circularly polarized light C1 incident on the optical member 20 from the display 10 partially passes through the reflective optical element 22, but is attenuated to approximately half the intensity at the time of transmission. The image light ML having passed through the reflective optical element 22 passes through the first wave plate 124, passes through the lens member 21, and passes through the second wave plate 224. At this time, the image light ML is refracted by the lens member 21 and subjected to an action of being relatively converged by positive power. When the image light ML passes through the first wave plate 124 and the second wave plate 224 in the forward direction, the image light ML is converted from the right-handed circularly polarized light C1 into the first linearly polarized light L1 in the first polarization direction, and is incident on the polarizing optical element 25. The image light ML incident on the polarizing optical element 25 is efficiently reflected as the first linearly polarized light L1 by the polarizing optical element 25, and is converted into the right-handed circularly polarized light C1 by passing through the second wave plate 224 and the first wave plate 124 from opposite directions when passing through the lens member 21. The image light ML emitted from the first wave plate 124 is reflected by the reflective optical element 22 and is subjected to an action of being relatively converged by positive power, but is attenuated to approximately half of the intensity at the time of reflection. At this time, the image light ML is converted from the right-handed circularly polarized light C1 into left-handed circularly polarized light C2. When the image light ML of the left-handed circularly polarized light C2 reflected by the reflective optical element 22 passes through the lens member 21, the image light ML passes through the first wave plate 124 and the second wave plate 224 in the forward direction, is converted into the second linearly polarized light L2 in the second polarization direction, and is incident on the polarizing optical element 25. In the above, the image light ML reciprocates in the lens member 21 by being reflected by the reflective optical element 22 to pass through the lens member 21 twice, and consequently passes through the lens member 21 three times. The image light ML incident on the polarizing optical element 25 via the lens member 21 efficiently passes through the polarizing optical element 25 as the second linearly polarized light L2 in the second polarization direction. The image light ML emitted to the outside of the optical member 20 is incident on the pupil position PP at which the eye EY of the wearer US is disposed in a collimated state by the converging action of the optical member 20 (see FIG. 2). In other words, the wearer US wearing the first display device 100A can observe a virtual image of the image light ML.

In the case of the display optical systems 103*a* and 103*b* shown in FIG. 2, since the second optical surface 21*b* is concave, the light beam angle of the image light ML emitted from the image display panel 11 can be inclined inward, that is, toward the optical axis AX, and the material of the lens member 21 can have a margin in terms of the total reflection angle, and thus it is possible to increase the lens curvature and reduce the size of the image display panel 11 and the entire optical system. Furthermore, a ratio between a curvature R1 of the first optical surface 21*a* and a curvature R2 of the second optical surface 21*b* satisfies the following relationship:

$$0.5 \leq R1/R2 \leq 1.5.$$

Thus, the light beam angle of the image light ML emitted from the image display panel 11 can be made substantially parallel to a panel normal direction (direction parallel to the optical axis AX). Thereby, with respect to a video viewed by a user through the display optical systems 103*a* and 103*b*, the image light ML emitted in the panel normal direction is incident on the eye EY, and thus it is possible to visually recognize a virtual image which is a display video without brightness or color unevenness. In particular, a curvature R2 of the second optical surface 21*b* is preferably 5 mm to 30 mm.

The virtual image display devices 100A and 100B and the optical unit 100 according to the first embodiment described above include the display 10 that emits the circularly polarized image light ML, and the optical member 20 that folds back the image light ML twice by reflection twice to form a virtual image. The optical member 20 includes the lens member 21, the transmissive reflective optical element 22 that is provided facing the first optical surface 21*a* of the lens member 21 which is close to the display 10, the reflective polarizing optical element 25 that is provided facing the second optical surface 21*b* of the lens member 21 which is far from the display 10 and that reflects the image light ML, which is the first polarized light L1, that is, linearly polarized light in the first polarization direction, and the wave plates 124 and 224 that are provided between the reflective optical element 22 and the polarizing optical element 25, formed of a liquid crystal material such as a photo-crosslinkable polymer liquid crystal material, converts the image light ML having passed through the reflective optical element 22 into the first polarized light L1, that is, linearly polarized light in the first polarization direction, and converts the image light ML having been reflected by the reflective optical element 22 and reciprocating to pass through the lens member 21 twice into the second linearly polarized light L2 in the second polarization direction.

In the virtual image display device, since the wave plates 124 and 224 are formed of a liquid crystal material such as a photo-crosslinkable polymer liquid crystal material, the film-shaped wave plates 124 and 224 may be attached to the optical surfaces 21*a* and 21*b*, but the film-shaped wave plates 124 and 224 can be directly formed at the optical surfaces 21*a* and 21*b*, and the birefringence characteristics of the wave plates 124 and 224 are easily set as desired. That is, even when the first optical surface 21*a* and the second optical surface 21*b* are curved surfaces, the birefringence characteristics of the wave plates 124 and 224 formed at these optical surfaces 21*a* and 21*b* are easily set as desired.

The first polarization direction and the second polarization direction are directions for convenience, and specific definitions of the directions can be replaced. That is, in the examples shown in FIGS. 2 and 4, the polarizing optical element 25 reflects the first polarized light L1 in the first polarization direction which is the Y direction, but the polarizing optical element 25 may reflect the first polarized light L1 in the first polarization direction which is the X direction. In this case, the direction of the main axes of the wave plates 124 and 224 is adapted to match the polarizing optical element 25.

In the virtual image display devices 100A and 100B according to the first embodiment, the wave plates 124 and 224 are separately provided between the first optical surface 21*a* and the reflective optical element 22 and between the second optical surface 21*b* and the polarizing optical element 25. Thereby, the film thickness distribution can be canceled out between the wave plates 124 and 224, and the accuracy of the wave plates 124 and 224 can be easily improved. The wave plates 124 and 224 are covered with the reflective optical element 22 and the polarizing optical element 25, and are prevented from being deteriorated due to an external environment.

In the virtual image display devices 100A and 100B according to the first embodiment, the first optical surface 21*a* is a convex surface, and the second optical surface 21*b* is a concave surface. When the first optical surface 21*a* is a convex surface, the reflective optical element 22 can have positive power, and the virtual image display devices 100A and 100B can be easily miniaturized by reducing a distance between the display 10 and the optical member 20. When the second optical surface 21*b* is a concave surface, the light beam angle of the image light ML emitted from the image display panel 11 can be inclined to the inner side, that is, the optical axis AX, and the refraction of the main light beam on the second optical surface 21*b* of the lens member 21 can be reduced as a whole, making it easy to reduce the aberration of the optical member 20.

Second Embodiment

A virtual image display device and the like according to a second embodiment will be described below. The virtual image display device according to the second embodiment is provided by partially modifying the virtual image display device according to the first embodiment. Thus, description of portions common to the virtual image display device according to the first embodiment will not be omitted.

Figure 5:
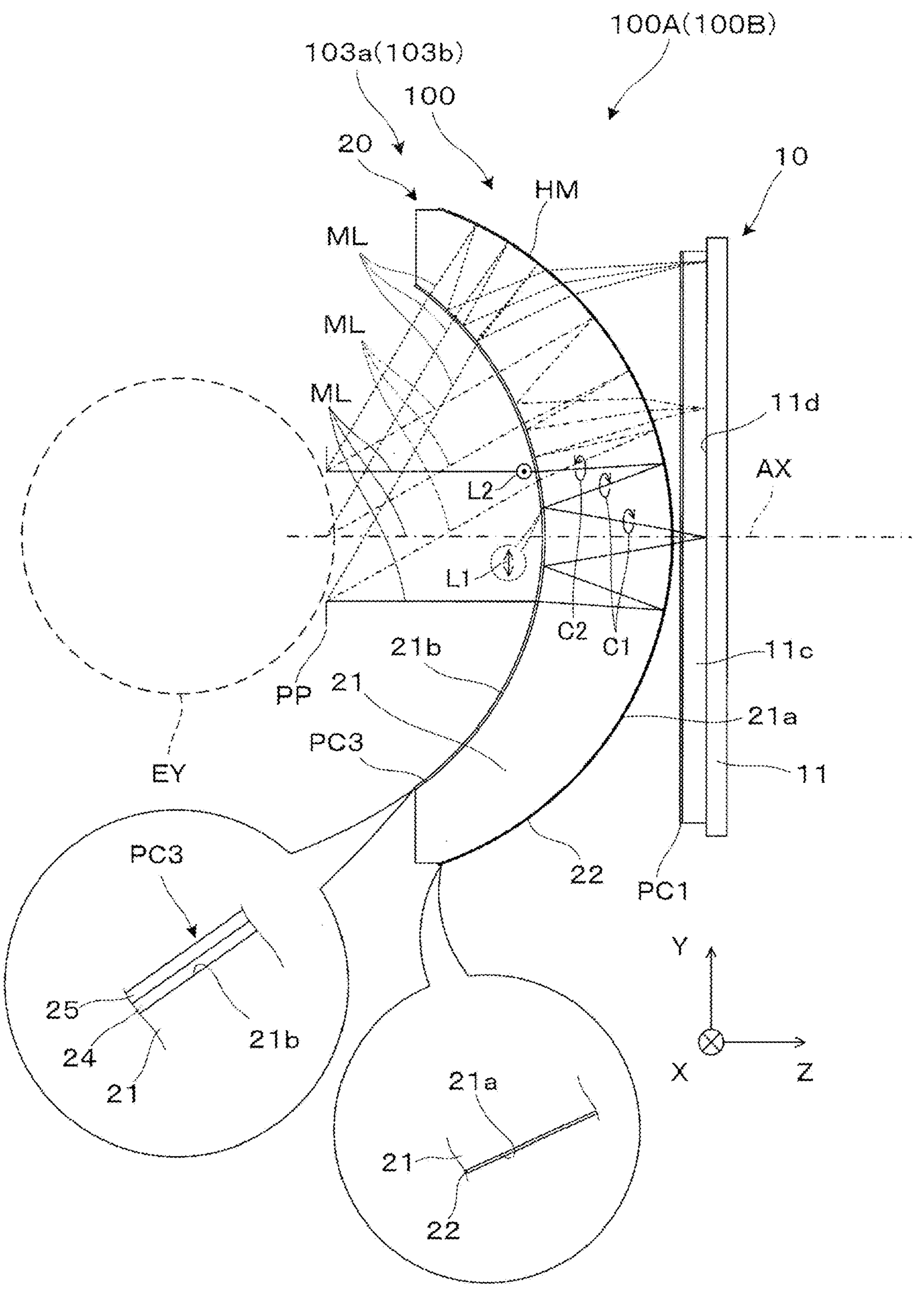
FIG. 5 is a diagram showing a virtual image display device according to a second embodiment.

As shown in FIG. 5, an optical member 20 includes a reflective optical element 22, a lens member 21, and a polarizing control member PC3 in order from an image display panel 11 side. Here, the reflective optical element 22 is a transmissive mirror HM and is formed at a first optical surface 21*a* of the lens member 21. The polarizing control member PC3 includes a ¼ wave plate 24 and a reflective polarizing optical element 25 in order from the lens member 21 side. That is, the ¼ wave plate 24 is formed at a second optical surface 21*b* of the lens member 21 so as to be interposed between the second optical surface 21*b*, which is a curved surface, and the polarizing optical element 25.

Figure 6:
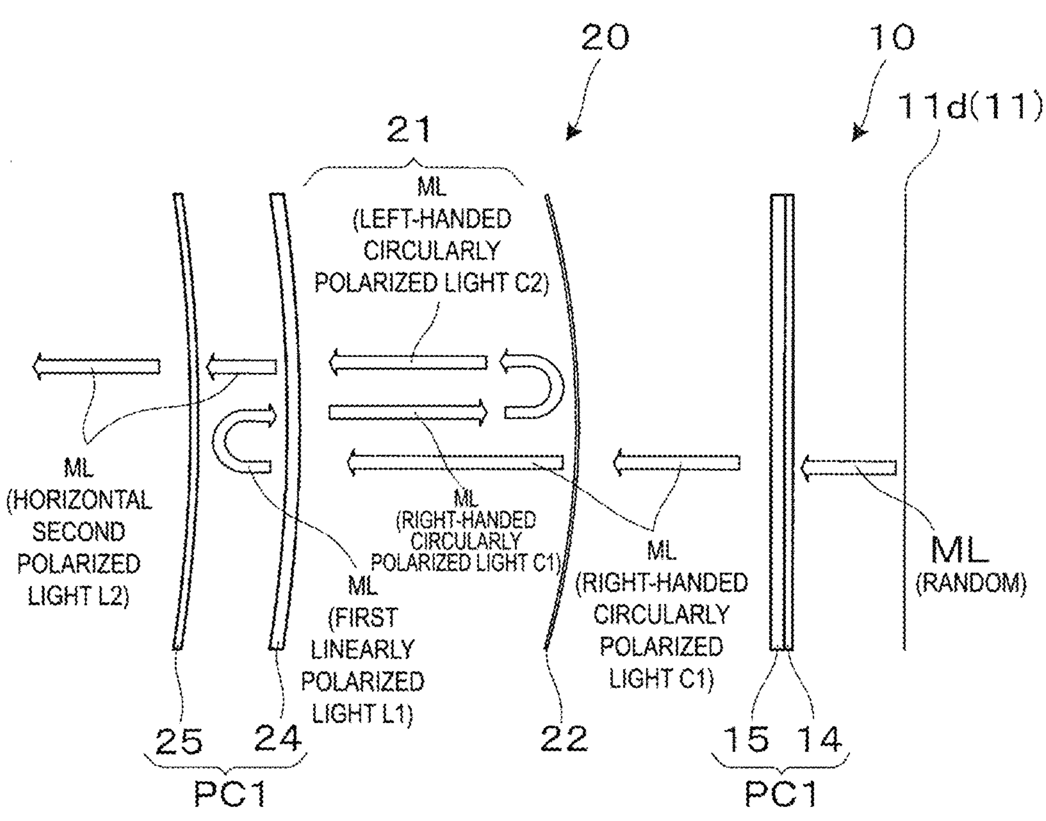
FIG. 6 is a conceptual diagram showing optical operations of the virtual image display device according to the second embodiment.

FIG. 6 is a conceptual diagram showing optical operations of a first display optical system 103*a* shown in FIG. 5. In this case, image light ML of right-handed circularly polarized light C1 incident on the optical member 20 from the display 10 partially passes through the reflective optical element 22 and is incident on the lens member 21. The image light ML having passed through the lens member 21 passes through the ¼ wave plate 24 in the forward direction. The image light ML having passed through the ¼ wave plate 24 in the forward direction is converted into first linearly polarized light L1 in a first polarization direction, and is incident on the polarizing optical element 25. The image light ML incident on the polarizing optical element 25 is efficiently reflected as the first linearly polarized light L1 by the polarizing optical element 25 and passes through the ¼ wave plate 24 in the opposite direction. The image light ML having passed through the ¼ wave plate 24 from the opposite direction is converted into right-handed circularly polarized light C1, is incident on the reflective optical element 22 via the lens member 21, is reflected by the reflective optical element 22, and is subjected to an action of being relatively converged by positive power. At this time, the image light ML is converted from the right-handed circularly polarized light C1 into left-handed circularly polarized light C2. The image light ML of the left-handed circularly polarized light C2 reflected by the reflective optical element 22 passes through the ¼ wave plate 24 in the forward direction via the lens member 21. The image light ML having passed through the ¼ wave plate 24 in the forward direction is converted into second linearly polarized light L2 in a second polarization direction, and is incident on the polarizing optical element 25. The image light ML incident on the polarizing optical element 25 efficiently passes through the polarizing optical element 25 as the second linearly polarized light L2 in the second polarization direction.

In the case of the present embodiment, the ¼ wave plate 24 is provided in the polarizing control member PC3, and it is sufficient to provide a single wave plate in the optical member 20, making it possible to simplify the manufacturing process of the optical member 20.

Third Embodiment

A virtual image display device and the like according to a third embodiment will be described below. The virtual image display device according to the third embodiment is provided by partially modifying the virtual image display device according to the first embodiment. Thus, description of portions common to the virtual image display device according to the first embodiment will not be omitted.

Figure 7:
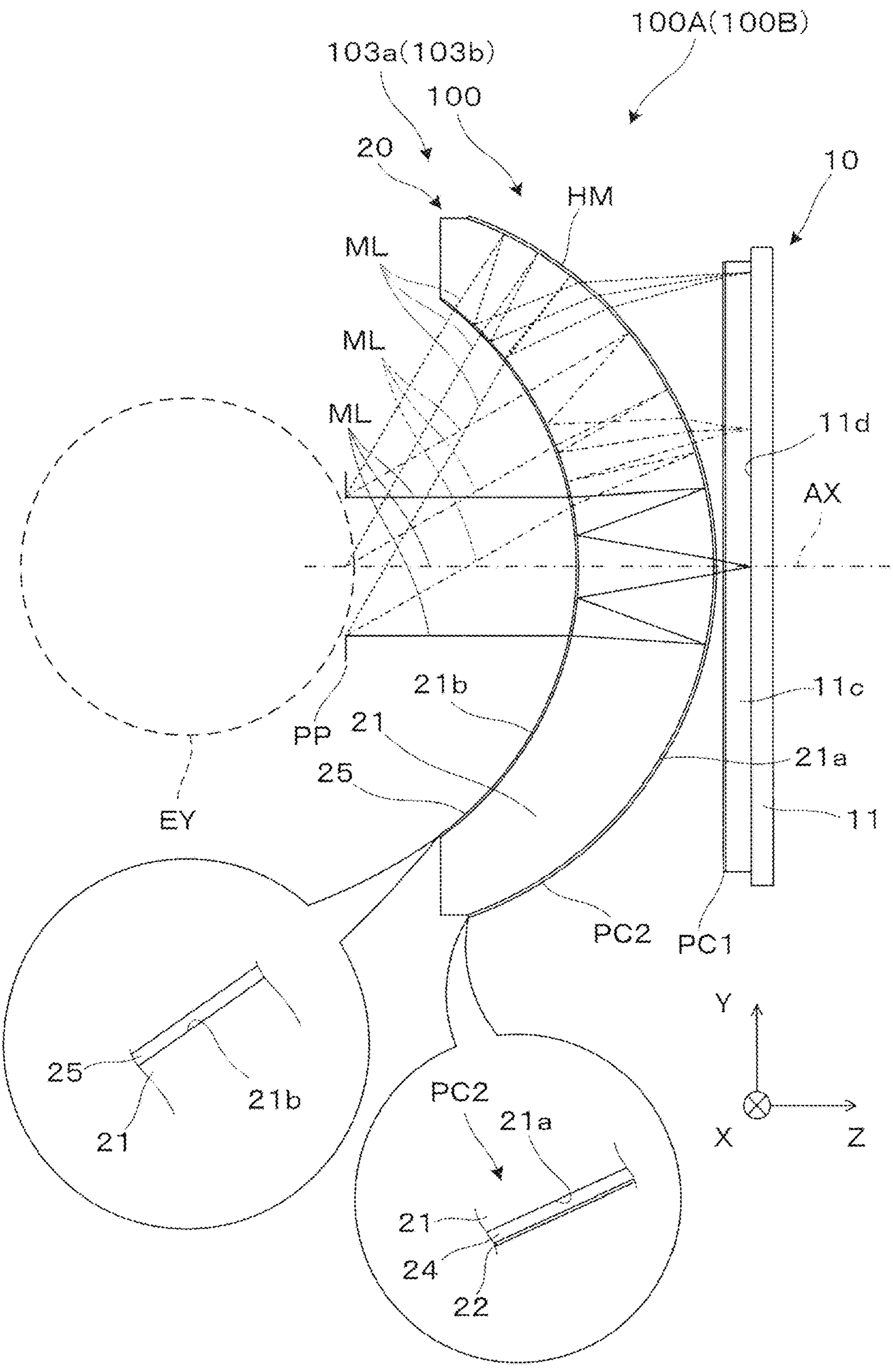
FIG. 7 is a diagram showing a virtual image display device according to a third embodiment.

As shown in FIG. 7, an optical member 20 includes a polarizing control member PC2, a lens member 21, and a reflective polarizing optical element 25 in order from an image display panel 11 side. The polarizing control member PC2 includes a reflective optical element 22 and a ¼ wave plate 24. That is, the ¼ wave plate 24 is formed at a first optical surface 21*a* of the lens member 21 so as to be interposed between a first optical surface 21*a*, which is a curved surface, and the reflective optical element 22.

In the case of the present embodiment, the ¼ wave plate 24 is provided in the polarizing control member PC2, and it is sufficient to provide a single wave plate in the optical member 20, making it possible to simplify the manufacturing process of the optical member 20. In this case, when the ¼ wave plate 24 is formed at the first optical surface 21*a*, an in-plane distribution may be positively applied to the thickness of a liquid crystal material applied onto the first optical surface 21*a*. In the case of the present embodiment, the angle of the image light ML passing through the ¼ wave plate 24 changes and increases depending on an image height which is a distance from an optical axis AX, and when the thickness of the liquid crystal material on the peripheral side is reduced in accordance with such a change in the passing angle, it is possible to enhance the uniformity of the function of the ¼ wave plate 24 in the plane of the ¼ wave plate 24 and to curb the occurrence of ghost light. As a method of adjusting the thicknesses of the liquid crystal material, it is conceivable to adjust the thickness of the liquid crystal material applied onto the first optical surface 21*a* by using, for example, an inkjet. That is, the amount of liquid crystal material applied onto the first optical surface 21*a* is adjusted by the inkjet, and UV irradiation is performed on the spot. Thereby, it is possible to provide liquid crystal films having different thicknesses in the plane on the first optical surface 21*a*, form different phase difference distributions at respective positions in the plane, and to uniformize the function of the ¼ wave plate 24 with respect to the image light ML.

Fourth Embodiment

A virtual image display device and the like according to a fourth embodiment will be described below. The virtual image display device according to the fourth embodiment is provided by partially modifying the virtual image display device according to the first embodiment. Thus, description of portions common to the virtual image display device according to the first embodiment will not be omitted.

Figure 8:
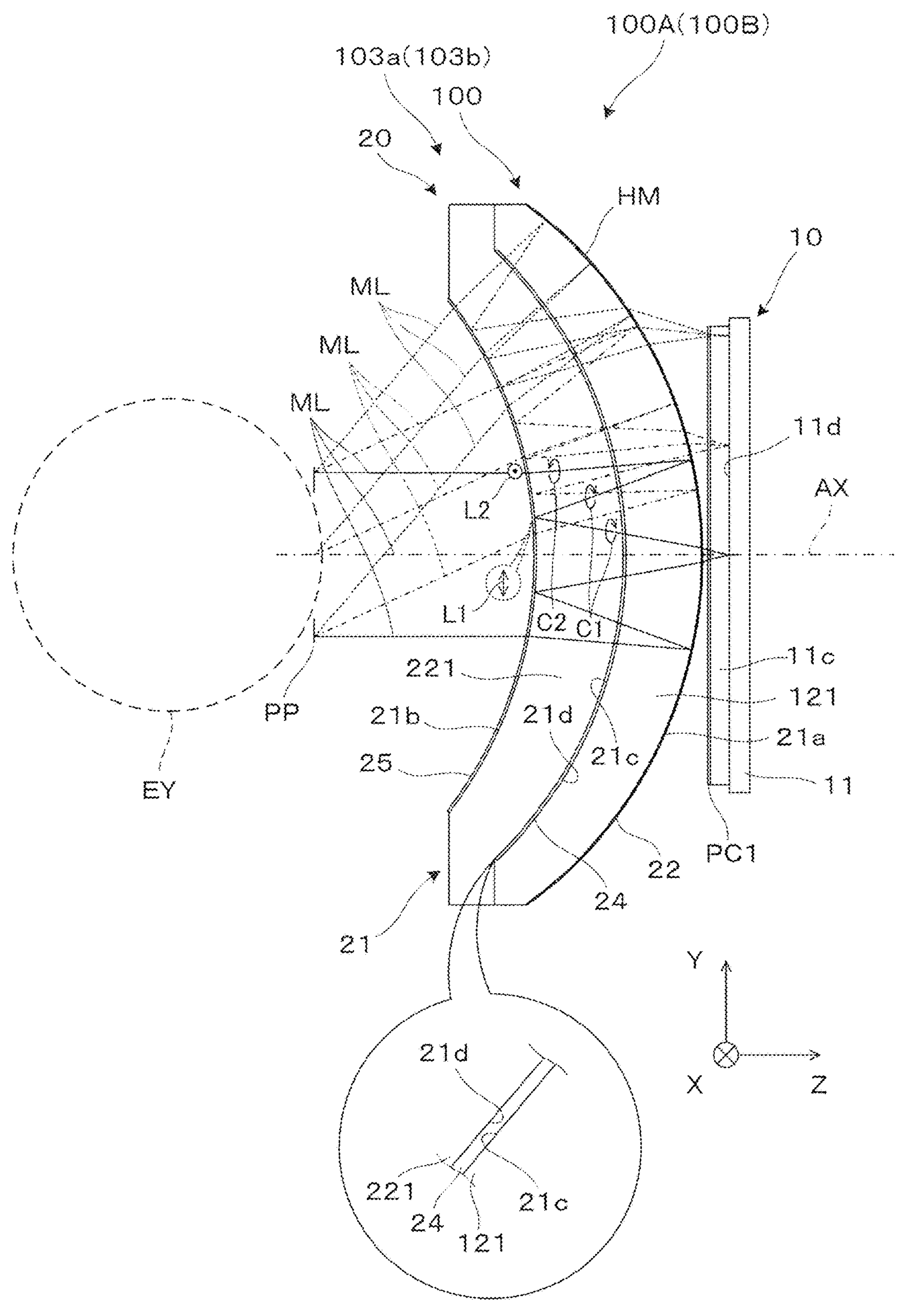
FIG. 8 is a diagram showing a virtual image display device according to a fourth embodiment.

As shown in FIG. 8, in a first display optical system 103*a*, a lens member 21 is a meniscus lens having positive power as a whole, and includes a first lens 121 and a second lens 221, which are bonded together via a ¼ wave plate 24.

An optical surface 21*c* on the emission side of the first lens 121 is a concave surface, an optical surface 21*d* on the incidence side of the second lens 221 is a convex surface, and the curvatures of both are the same. In this case, the ¼ wave plate 24 has a shape conforming to the optical surface 21*c*, which is a curved surface, and the optical surface 21*d*. That is, the ¼ wave plate 24 is embedded in the lens member 21.

Figure 9:
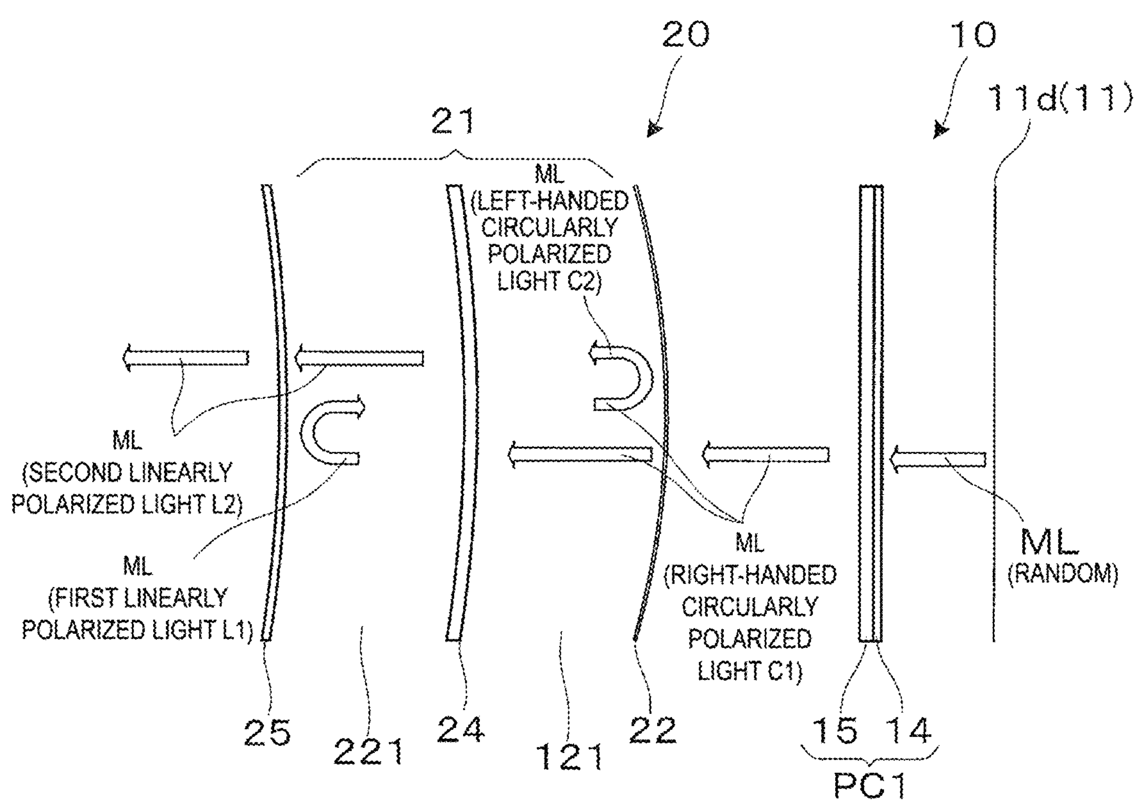
FIG. 9 is a conceptual diagram showing optical operations of the virtual image display device according to the fourth embodiment.

FIG. 9 is a conceptual diagram showing optical operations of the first display optical system 103*a* shown in FIG. 8. In this case, image light ML of right-handed circularly polarized light C1 incident on the optical member 20 from a display 10 partially passes through a reflective optical element 22 and is incident on the lens member 21. The image light ML having passed through the first lens 121 passes through the ¼ wave plate 24 in the forward direction to be converted into the first linearly polarized light L1 in the first polarization direction, and passes through the second lens 221 to be incident on the polarizing optical element 25. The image light ML incident on the polarizing optical element 25 is efficiently reflected as the first linearly polarized light L1 by the polarizing optical element 25 and passes through the ¼ wave plate 24 in the opposite direction. The image light ML having passed through the ¼ wave plate 24 from the opposite direction is converted into right-handed circularly polarized light C1 to be incident on the reflective optical element 22. At this time, the image light ML is converted from the right-handed circularly polarized light C1 into left-handed circularly polarized light C2. When the image light ML of the left-handed circularly polarized light C2 reflected by the reflective optical element 22 passes through the lens member 21, the image light ML passes through the ¼ wave plate 24 in the forward direction, is converted into the second linearly polarized light L2 in the second polarization direction, and is incident on the polarizing optical element 25. The image light ML incident on the polarizing optical element 25 efficiently passes through the polarizing optical element 25 as the second linearly polarized light L2 in the second polarization direction.

In the case of the present embodiment, a liquid crystal material such as a photo-crosslinkable polymer liquid crystal material can be applied to one of the first lens 121 and the second lens 221, and a liquid crystal material such as a photo-crosslinkable polymer liquid crystal material can be sealed between the lenses 121 and 221. In this case, one of the first lens 121 and the second lens 221 serves as a base material, and the other serves as a cover lens. Thereby, there is no possibility that the ¼ wave plate 24 will come into contact with a user's hand, and the periphery of the ¼ wave plate 24 is sealed with an adhesive or the like to prevent moisture from entering the ¼ wave plate 24, thereby making it easy to curb the deterioration of the ¼ wave plate 24.

In addition, when the first lens 121 and the second lens 221 have different refractive indices, a lens effect can be produced between glass materials, which can lead to a further increase in resolution and a further reduction in size, thickness, and weight of the entire optical system.

Fifth Embodiment

A virtual image display device and the like according to a fifth embodiment will be described below. The virtual image display device according to the fifth embodiment is provided by partially modifying the virtual image display device according to the first embodiment. Thus, description of portions common to the virtual image display device according to the first embodiment will not be omitted.

Figure 10:
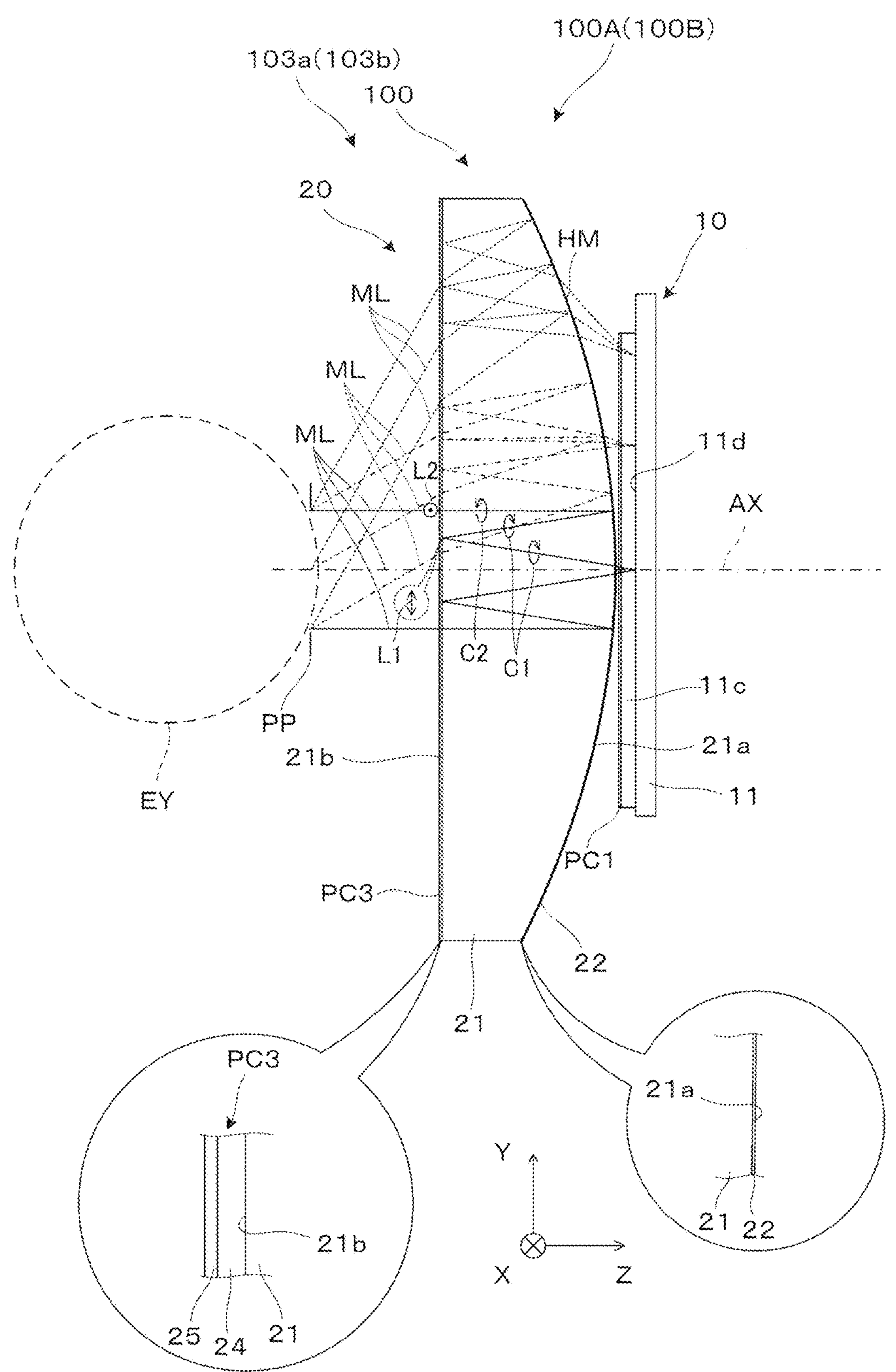
FIG. 10 is a diagram showing a virtual image display device according to a fifth embodiment.

As shown in FIG. 10, in a first display optical system 103*a*, a lens member 21 of an optical member 20 is a plano-convex lens. A first optical surface 21*a* is a spherical surface or an aspherical surface. In this case, since a second optical surface 21*b* is a flat surface, even when a ¼ wave plate 24 and a polarizing optical element 25 are attached to the lens member 21, the ¼ wave plate 24 and the polarizing optical element 25 before being attached to the optical member 20 do not need to have flexibility and do not need to be deformed in accordance with the second optical surface 21*b*. Thus, the ¼ wave plate 24 and the polarizing optical element 25 can be formed at a non-resin-based substrate such as glass. In addition, the second optical surface 21*b* is a flat surface, and thus it is relatively easy to adjust the thickness of a liquid crystal material when the ¼ wave plate 24 is directly formed at the second optical surface 21*b*.

The ¼ wave plate 24 may be formed at the first optical surface 21*a* and on the inner side of a reflective optical element 22, or may be formed inside the lens member 21.

In the case of the display optical systems 103*a* and 103*b* shown in the drawing, FOV120° is achieved, and a distance from the display 10 to an emission surface at the rear end of the outer edge of the optical member 20 is 14.8 mm.

Sixth Embodiment

A virtual image display device and the like according to a sixth embodiment will be described below. The virtual image display device according to the sixth embodiment is provided by partially modifying the virtual image display device according to the first embodiment. Thus, description of portions common to the virtual image display device according to the first embodiment will not be omitted.

Figure 11:
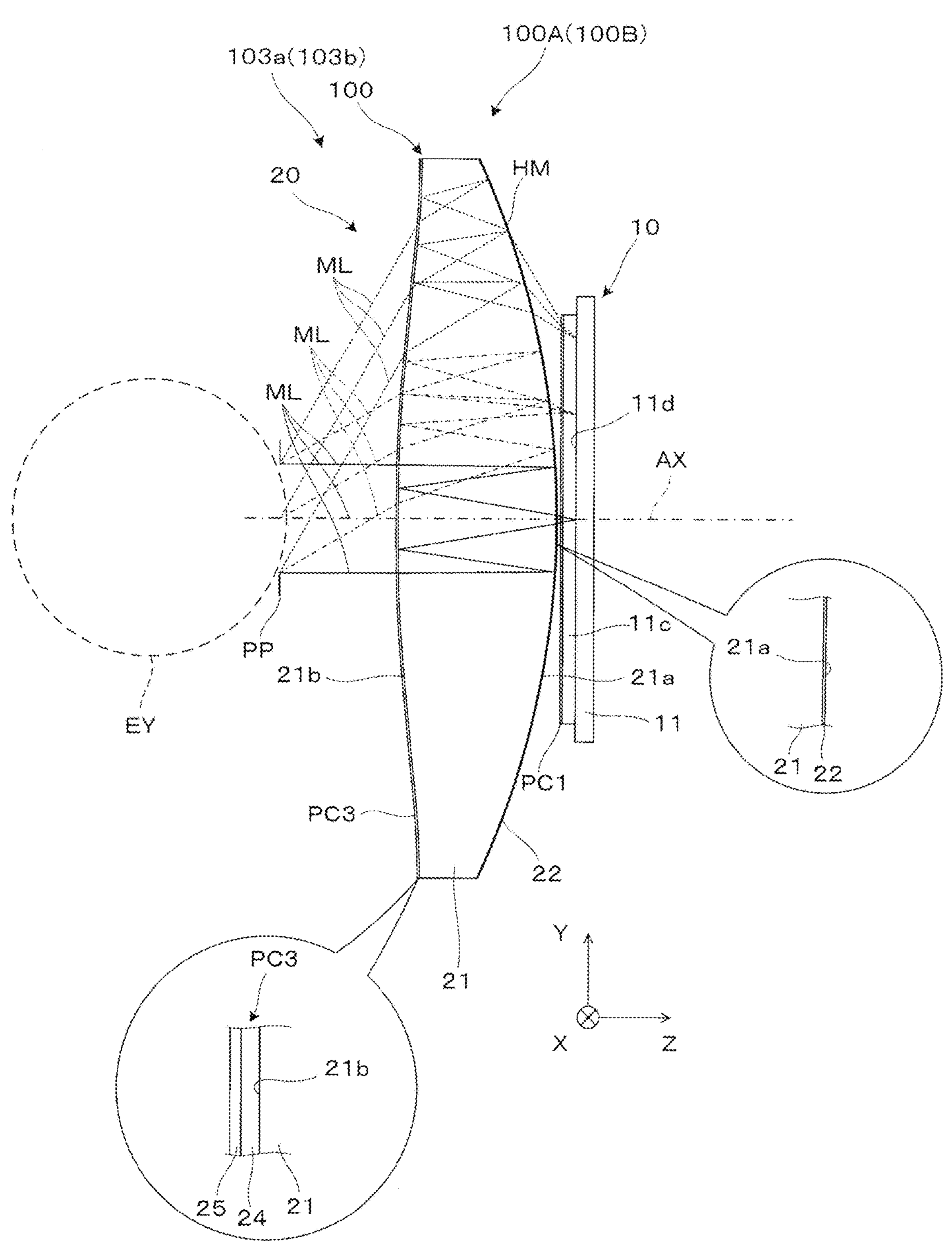
FIG. 11 is a diagram showing a virtual image display device according to a sixth embodiment.

As shown in FIG. 11, in a first display optical system 103*a*, a lens member 21 of an optical member 20 is a biconvex lens. A first optical surface 21*a* and a second optical surface 21*b* are spherical surfaces or aspherical surfaces. When the first optical surface 21*a* and the second optical surface 21*b* are curved surfaces, it is easy to reduce aberration.

A ¼ wave plate 24 may be formed at the first optical surface 21*a* and on the inner side of a reflective optical element 22, or may be formed inside the lens member 21.

In the case of the display optical systems 103*a* and 103*b* shown in the drawing, FOV120° is achieved, and a distance from a display 10 to an emission surface at the rear end of the center of the optical member 20 is 14.9 mm.

Modification Examples and Others

These are descriptions of the present disclosure with reference to the embodiments. However, the present disclosure is not limited to the embodiments described above. It is possible to implement the present disclosure in various modes without departing from the spirit of the disclosure. For example, the following modifications can be made.

In the above-described embodiments, the lens member 21 incorporated into the optical member 20 is merely an example, and one or two lenses may be included in a bonded state or a separated state.

Although not essential, the optical member 20 is preferably at least FOV100°, and a distance from the display 10 to an emission surface at the rear end of the center of the optical member 20 is preferably 20 mm or less.

Although it has been assumed above that the HMD 200 is worn on the head and is used, the virtual image display devices 100A and 100B may also be used as a hand-held display that is not worn on the head and is to be looked into like binoculars. That is, in the present disclosure, the head-mounted display also includes a hand-held display.

The first wave plate 124 and the second wave plate 224 are not limited to the photo-crosslinkable polymer liquid crystal material, but may be various liquid crystal materials, and may be attached onto the first optical surface 21*a* or the second optical surface 21*b*.

The polarization state shown in FIG. 4 and the like is an example, and for example, the image light ML emitted from the display 10 can be left-handed circularly polarized light, and in this case, the polarizing optical element 25 needs to selectively reflect only vertically polarized light in a polarization direction corresponding to the X direction which is the horizontal direction and to selectively transmit linearly polarized light in a polarization direction corresponding to the Y direction which is the vertical direction.

A first virtual image display device according to a specific aspect includes a display that emits circularly polarized image light, and an optical member that folds back the image light twice by reflection to form a virtual image, in which the optical member includes a lens member, a transmissive reflective optical element that is provided facing a first optical surface of the lens member which is close to the display, a reflective polarizing optical element that is provided facing a second optical surface of the lens member which is far from the display and reflects image light, which is linearly polarized light in a first polarization direction, and a wave plate that is provided between the reflective optical element and the polarizing optical element, is formed of a liquid crystal material, converts the image light having passed through the reflective optical element into linearly polarized light in a first polarization direction, and converts the image light, which is reflected by the reflective optical element to reciprocate, into linearly polarized light in a second polarization direction.

In the virtual image display device, since the wave plate is formed of the liquid crystal material, it is easy to attach the film-shaped wave plate to the optical surface, or it is not necessary to attach the film-shaped wave plate to the optical surface, and thus it is possible to directly form the film-shaped wave plate on the optical surface, and the birefringence characteristics of the wave plate are easily set as desired. For example, even when the first optical surface and the second optical surface are curved surfaces, the birefringence characteristics of the wave plates formed at these optical surfaces are easily set as desired.

In the virtual image display device according to the specific aspect, the liquid crystal material is a photo-crosslinkable polymer liquid crystal material. In this case, the wave plate is manufactured more easily and accurately.

In the virtual image display device according to the specific aspect, the photo-crosslinkable polymer liquid crystal material is an ultraviolet-curable photo-crosslinkable polymer liquid crystal material. In this case, the photo-crosslinkable polymer liquid crystal material layer applied onto the optical surface or a light-transmitting resin base material is irradiated with ultraviolet light, and thus it is possible to control the alignment state of molecular species exhibiting liquid crystalline properties while curing the photo-crosslinkable polymer liquid crystal material layer.

In the virtual image display device according to a specific aspect, the wave plate is formed by irradiating a thin film, which is formed of the photo-crosslinkable liquid crystal material, with ultraviolet light having a controlled polarization state and annealing the thin film. In this case, the molecular species of which the alignment state has not been changed by ultraviolet light are changed into liquid crystals, and the alignment state thereof can be made to coincide with the molecular species which have already been in a target alignment state.

In the virtual image display device according to a specific aspect, the wave plate is provided between the second optical surface and the polarizing optical element.

In the virtual image display device according to the specific aspect, the wave plate is provided between the first optical surface and the reflective optical element.

In the virtual image display device according to a specific aspect, the wave plate is separately provided between the first optical surface and the reflective optical element and between the second optical surface and the polarizing optical element.

In the virtual image display device according to a specific aspect, the wave plate is embedded in the lens member.

In the virtual image display device according to the specific aspect, the polarizing optical element is a reflective polarizer having a wire grid layer. In this case, the polarizing optical element can be attached onto the optical surface, and even when the optical surface is a curved surface, it is relatively easy to form the polarizing optical element on the optical surface.

In the virtual image display device according to the specific aspect, the first optical surface is a convex surface. In this case, the reflective optical element can have positive power, and the virtual image display device can be easily miniaturized by narrowing an interval between the display and the optical member.

In the virtual image display device according to the specific aspect, the second optical surface is a concave surface. In this case, the refraction of the main light beam on the second optical surface of the lens member can be reduced as a whole, and the aberration of the optical member can be easily reduced.

A second virtual image display device according to a specific aspect includes a display that emits circularly polarized image light, and an optical member that folds back the image light twice by reflection to form a virtual image, in which the optical member includes a lens member, a transmissive reflective optical element that is provided facing a first optical surface of the lens member which is close to the display, a reflective polarizing optical element that is provided facing a second optical surface of the lens member which is far from the display and reflects image light, which is linearly polarized light in a first polarization direction, and a wave plate that is provided between the reflective optical element and the polarizing optical element, is formed in a layer shape on a curved optical surface of the lens member, converts the image light having passed through the reflective optical element into linearly polarized light in a first polarization direction, and converts the image light, which is reflected by the reflective optical element to reciprocate, into linearly polarized light in a second polarization direction.

In the second virtual image display device according to a specific aspect, the wave plate is formed by being applied onto the curved optical surface of the lens member.

An optical unit according to a specific aspect includes a display that emits circularly polarized image light, and an optical member that folds back the image light twice by reflection to form a virtual image, in which the optical member includes a lens member, a transmissive reflective optical element that is provided facing a first optical surface of the lens member which is close to the display, a reflective polarizing optical element that is provided facing a second optical surface of the lens member which is far from the display and reflects image light, which is linearly polarized light in a first polarization direction, and a wave plate that is provided between the reflective optical element and the polarizing optical element, is formed of a liquid crystal material, converts the image light having passed through the reflective optical element into linearly polarized light in a first polarization direction, and converts the image light, which is reflected by the reflective optical element to reciprocate, into linearly polarized light in a second polarization direction.

What is claimed is:

1. A virtual image display device comprising:

a display that emits circularly polarized image light; and an optical member that folds back the image light twice by reflection to form a virtual image, wherein the optical member includes a lens member, a transmissive reflective optical element that is provided facing a first optical surface of the lens member that is close to the display, a reflective polarizing optical element that is provided facing a second optical surface of the lens member that is far from the display and reflects image light, that is linearly polarized light in a first polarization direction, and a wave plate that is provided between the transmissive reflective optical element and the reflective polarizing optical element, is formed of a liquid crystal material, converts the image light having passed through the transmissive reflective optical element into the linearly polarized light in the first polarization direction, and converts the image light, that is reflected by the transmissive reflective optical element to reciprocate, into linearly polarized light in a second polarization direction, wherein the wave plate comprises a first wave plate provided between the first optical surface and the transmissive reflective optical element, and a second wave plate provided between the second optical surface and the reflective polarizing optical element.

2. The virtual image display device according to claim 1, wherein the liquid crystal material is a photo-crosslinkable polymer liquid crystal material.

3. The virtual image display device according to claim 2, wherein the photo-crosslinkable polymer liquid crystal material is an ultraviolet-curable photo-crosslinkable polymer liquid crystal material.

4. The virtual image display device according to claim 2, wherein the first wave plate and the second wave are each formed by irradiating a thin film, that is formed of the photo-crosslinkable polymer liquid crystal material, with ultraviolet light having a controlled polarization state and annealing the thin film.

5. The virtual image display device according to claim 1, wherein the reflective polarizing optical element is a reflective polarizer having a wire grid layer.

6. The virtual image display device according to claim 1, wherein the first optical surface is a convex surface.

7. The virtual image display device according to claim 1, wherein the second optical surface is a concave surface.

8. A virtual image display device comprising:

a display that emits circularly polarized image light; and an optical member that folds back the image light twice by reflection to form a virtual image, wherein the optical member includes a lens member, a transmissive reflective optical element that is provided facing a first optical surface of the lens member that is close to the display, a reflective polarizing optical element that is provided facing a second optical surface of the lens member that is far from the display and reflects image light, that is linearly polarized light in a first polarization direction, and a wave plate that is provided between the transmissive reflective optical element and the reflective polarizing optical element, converts the image light having passed through the transmissive reflective optical element into linearly polarized light in the first polarization direction, and converts the image light, that is reflected by the transmissive reflective optical element to reciprocate, into linearly polarized light in a second polarization direction, wherein the wave plate comprises a first wave plate provided between the first optical surface and the transmissive reflective optical element, and a second wave plate provided between the second optical surface and the reflective polarizing optical element, wherein the first wave plate and the second wave plate are each formed in a layer shape on a curved optical surface of the lens member.

9. The virtual image display device according to claim 8, wherein the first wave plate and the second wave plate are each formed by being applied onto the curved optical surface of the lens member.

10. An optical unit comprising:

a display that emits circularly polarized image light; and an optical member that folds back the image light twice by reflection to form a virtual image, wherein the optical member includes a lens member, a transmissive reflective optical element that is provided facing a first optical surface of the lens member that is close to the display, a reflective polarizing optical element that is provided facing a second optical surface of the lens member that is far from the display and reflects image light, that is linearly polarized light in a first polarization direction, and a wave plate that is provided between the transmissive reflective optical element and the reflective polarizing optical element, is formed of a liquid crystal material, converts the image light having passed through the transmissive reflective optical element into linearly polarized light in the first polarization direction, and converts the image light, that is reflected by the transmissive reflective optical element to reciprocate, into linearly polarized light in a second polarization direction, wherein the wave plate comprises a first wave plate provided between the first optical surface and the transmissive reflective optical element, and a second wave plate provided between the second optical surface and the reflective polarizing optical element.

* * * * *